US009014233B2

(12) United States Patent
Ghosh

(10) Patent No.: US 9,014,233 B2
(45) **Date of Patent: *Apr. 21, 2015**

(54) DELAY-INDUCED SCATTERING WITH PHASE RANDOMIZATION AND PARTITIONED FREQUENCY HOPPING

(71) Applicant: AT&T Intellectual Property I, L.P., Atlanta, GA (US)

(72) Inventor: Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/687,428

(22) Filed: Nov. 28, 2012

(65) Prior Publication Data

US 2013/0083788 A1 Apr. 4, 2013

Related U.S. Application Data

(63) Continuation of application No. 11/953,158, filed on Dec. 10, 2007, now Pat. No. 8,363,694, which is a continuation of application No. 10/683,891, filed on Oct. 10, 2003, now Pat. No. 7,336,694.

(51) Int. Cl.
*H04B 1/00* (2006.01)
*H04B 1/713* (2011.01)
(Continued)

(52) U.S. Cl.
CPC ................ *H04B 1/713* (2013.01); *H04B 1/715* (2013.01); *H04B 7/2621* (2013.01); *H04B 2001/7154* (2013.01); *H04N 7/2643* (2013.01)

(58) Field of Classification Search
USPC ......... 375/130, 132, 133, 134, 137, 138, 150, 375/142, 145, 295, 299, 219, 220, 315, 316, 375/326, 346, 347, 350; 370/319, 321, 310, 370/337, 336, 335, 344, 347, 348, 464, 478, 370/479, 480, 481, 482, 314, 341, 343, 485
See application file for complete search history.

(56) References Cited

U.S. PATENT DOCUMENTS 5,103,459 A 4/1992 Gilhousen et al.
5,301,188 A 4/1994 Kotzin et al.
(Continued)

FOREIGN PATENT DOCUMENTS

WO 2005039198 A3 4/2005

OTHER PUBLICATIONS

International Search Report for International Application No. PCT/US2004/032816, mailed Aug. 4, 2006, 3 pages.
(Continued)

*Primary Examiner* — Sam K Ahn
*Assistant Examiner* — Linda Wong
(74) *Attorney, Agent, or Firm* — Toler Law Group, PC

(57) ABSTRACT

A method includes generating multiple copies of a signal that comprises a plurality of time division multiple access frames. The multiple copies of the signal includes a first copy and one or more other copies of the signal. Each of the one or more other copies of the signal having a respective fixed delay and a respective phase relative to the first copy of the signal. The method also includes transmitting the multiple copies of the signal using hopping carrier frequencies. The hopping carrier frequencies associated with a consecutive pair of the plurality of time division multiple access frames are separated by an odd multiple of a separation value representing a frequency separation between two adjacent carrier signals. The respective fixed delay is proportional to the separation value for each of the one or more other copies of the signal.

20 Claims, 7 Drawing Sheets

(51) Int. Cl.

| | |
|---|---|
| ***H04B 1/715*** | (2011.01) |
| ***H04B 7/26*** | (2006.01) |
| ***H04N 19/63*** | (2014.01) |

(56) References Cited

U.S. PATENT DOCUMENTS

| | | | | |
|---|---|---|---|---|
| 5,991,331 | A | 11/1999 | Chennakeshu et al. | |
| 6,034,987 | A * | 3/2000 | Chennakeshu et al. | 375/133 |
| 6,112,094 | A * | 8/2000 | Dent | 455/452.1 |
| 6,157,669 | A | 12/2000 | Kotzin | |
| 6,321,082 | B1 | 11/2001 | Katz | |
| 6,480,721 | B1 | 11/2002 | Sydon et al. | |
| 6,694,147 | B1 | 2/2004 | Viswanath et al. | |
| 6,907,228 | B1 | 6/2005 | Lohtia et al. | |
| 7,065,156 | B1 | 6/2006 | Kuchi | |
| 7,336,694 | B2 | 2/2008 | Ghosh | |
| 7,406,261 | B2 | 7/2008 | Shattil | |
| 8,363,694 | B2 * | 1/2013 | Ghosh | 375/132 |
| 2002/0158797 | A1 | 10/2002 | Kelly et al. | |
| 2004/0125863 | A1 | 7/2004 | Ghosh | |
| 2004/0203538 | A1 * | 10/2004 | Leppanen et al. | 455/101 |
| 2005/0009473 | A1 | 1/2005 | Ranta et al. | |
| 2005/0030886 | A1 | 2/2005 | Wu et al. | |
| 2005/0053169 | A1 | 3/2005 | Jia et al. | |
| 2005/0078650 | A1 | 4/2005 | Ghosh | |
| 2006/0072649 | A1 | 4/2006 | Chang et al. | |

OTHER PUBLICATIONS

Written Opinion of the International Searching Authority for International Application No. PCT/US2004/032816, mailed Sep. 28, 2006, 4 pages.

Non-Final Rejection for U.S. Appl. No. 10/683,891 mailed Mar. 5, 2007, 15 pages.

Non-Final Rejection for U.S. Appl. No. 10/683,891 mailed Jul. 4, 2007, 8 pages.

Notice of Allowance for U.S. Appl. No. 10/683,891 mailed Nov. 6, 2007, 12 pages.

Non-Final Rejection for U.S. Appl. No. 11/953,158 mailed Mar. 26, 2013, 23 pages.

Notice of Allowance for U.S. Appl. No. 11/953,158 mailed Oct. 5, 2012, 18 pages.

* cited by examiner

DELAY-INDUCED SCATTERING WITH PHASE RANDOMIZATION AND PARTITIONED FREQUENCY HOPPING

CLAIM OF PRIORITY

The present application claims priority from and is a continuation of U.S. patent application Ser. No. 11/953,158, filed on Dec. 10, 2007 and titled "DELAY-INDUCED SCATTERING WITH PHASE RANDOMIZATION AND PARTITIONED FREQUENCY HOPPING," which claims priority from and is a continuation of U.S. patent application Ser. No. 10/683,891, filed on Oct. 10, 2003, now issued as U.S. Pat. No. 7,336,694, and titled "DELAY-INDUCED SCATTERING WITH PHASE RANDOMIZATION AND PARTITIONED FREQUENCY HOPPING," the contents of each of which are expressly incorporated herein by reference in their entirety.

FIELD OF THE DISCLOSURE

The present disclosure relates to methods and systems for improving frequency diversity gain in a hopping network with limited spectrum.

BACKGROUND

Frequency hopping combined with error protection techniques and interleaving is known to be efficient in combating fast channel fades. This combination often results in a near-Gaussian performance even over hostile Rayleigh channels under the right circumstances. In many cellular networks such as GSM, slow frequency hopping is an optional feature that can be turned on in the network. Each cell or sector is assigned a set of available frequencies over which its transceivers can hop. The carrier frequency of each transceiver is randomly changed every time-division multiple access (TDMA) frame, which lasts about 4.616 msec, based on a list of the available frequencies. Hopping over several frequencies randomizes the occurrence of deep fades, which is commonly referred to as the frequency diversity. This diversity improves the performance of a convolution decoder in the receiver.

If the spacing between the hopping frequencies is sufficiently large (e.g. greater than a coherence bandwidth) then fading envelopes are uncorrelated from one TDMA frame to a next TDMA frame, resulting in a high degree frequency diversity gain. However, a general tendency of GSM systems today is to decrease the separation between the hopping channels to realize tighter reuse patterns such 1/3 and 1/1 reuse. An advantage of this strategy is a high number of hopping frequencies being available in each cell. Yet, the tight frequency reuse also results in low frequency separation between the hopping channels, which decreases the frequency diversity. This problem applies particularly to environments where the coherence bandwidth is large, which may be the case in an indoor or a micro-cellular environment where the time dispersion of the channel is low. If only a small spectrum is available for frequency hopping then a gain associated with frequency hopping in such an environment is relatively small.

For high speed mobiles, the fades are sufficiently uncorrelated from one TDMA frame to the next TDMA frame due to the large Doppler spread. Thus, most of the gain is due to time diversity as compared to frequency diversity. However for pedestrian or stationary mobiles, the gains associated with frequency diversity are predominant provided that the fades from one TDMA frame to the next TDMA frame are sufficiently uncorrelated.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE PREFERRED EMBODIMENTS

Figure 1:
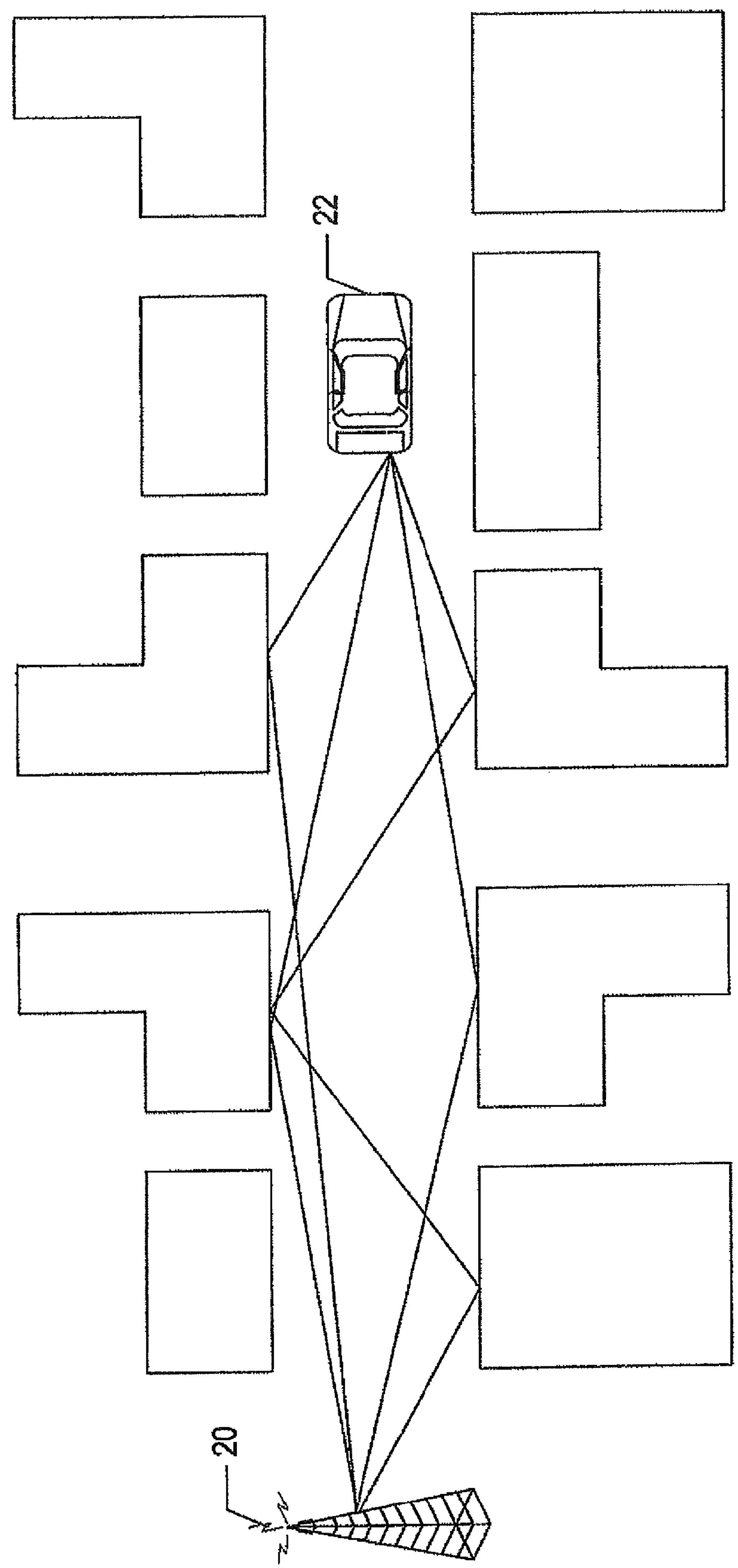
FIG. 1 shows an example of wirelessly transmitting a signal in an urban environment.

Disclosed herein are embodiments of methods and systems for increasing the frequency diversity gain in an environment with large coherence bandwidth and a relatively small frequency spectrum using a novel technique called Delay Induced Scattering with Phase Randomization. In brief, this technique comprises transmitting, from a single antenna, multiple copies of a signal which comprises TDMA frames. The multiple copies include at least a first copy and a second copy of the signal. Relative to the first copy, each of the other copies of the signal has a respective fixed delay and a respective random phase. Thus, the second copy has a fixed delay and a random phase relative to the first copy. If the multiple copies include a third copy of the signal, the third copy has a fixed delay which differs from the fixed delay associated with the second copy, and a random phase which differs from the random phase associated with the second copy. Any additional copy, if used, would have its own fixed delay and random phase. Each random phase changes from each of the TDMA frames to a next one of the TDMA frames. The copies of the signal are transmitted using a random sequence of hopping carrier frequencies. In one embodiment, consecutive pairs of the hopping carrier frequencies for consecutive pairs of the TDMA frames are separated by an odd multiple of a separation value W, where the fixed delay is selected to be about equal to $$\frac{1}{2W}.$$

Also disclosed herein are embodiments of methods and systems for partition staggered frequency hopping. Here, a group of hopping carrier frequencies are partitioned into at least two sets. Consecutive pairs of hopping carrier frequencies for consecutive pairs of the TDMA frames are randomly selected with a constraint of not being from the same one of the at least two sets. Use of partition staggered frequency hopping along with delay induced scattering with phase randomization further improves the frequency diversity gain in a hopping network with limited spectrum.

A detailed description of the embodiments is divided into four sections. Section 1 derives equations for a correlation of frequency selective fading. Section 2 describes embodiments of Delay Induced Scattering with Phase Randomization. Section 3 describes simulation results. Section 4 describes embodiments of Partition Staggered Frequency Hopping. Although much of the description is made with reference to two copies of a signal, those having ordinary skill will appreciate that embodiments of the present invention can use more than two copies.

1. Correlation of Frequency Selective Fading

As previously mentioned herein, the gain due to frequency diversity diminishes as the fading envelopes of two frequencies become correlated. This happens as the spectral separation between the two frequency-carriers decreases. In a limiting case when the fading envelopes are completely correlated to each other, the frequency diversity gain vanishes. In a realistic network due to the finite amount of available spectrum, the gains due to frequency diversity are somewhere in between that of ideal frequency hopping and no frequency hopping. In this section, a mathematical model that relates the correlation of the fading envelopes of two frequency carriers to their spectral separation and the characteristics of the environment (namely power delay profile) is disclosed.

FIG. 1 shows an example of wirelessly transmitting a signal in an urban environment. The urban environment causes a transmitted signal to traverse multiple paths from a transmitter 20 to a receiver 22. A signal received at the receiver 22 can be written as a linear superimposition of the signals from each path. The signals from each path arrive with their own complex gains $\alpha_i(t)$ and delays $\tau_i$. In a WSSUS (wide sense stationary with uncorrelated scattering) model of the channel, the paths are assumed to be uncorrelated and stationary. This implies that the complex gains $\alpha_i(t)$ are mutually independent of each other and the delays $\tau_i$ do not depend on time explicitly. Thus the received signal r(t) can be related to the transmitted signal s(t) as:

$$r(t)=\sum_{i=1}^{N}\alpha_i(t)e^{-2\pi jF_c\tau_i}s(t-\tau_i) \tag{1}$$

The complex gain associated with each path can be adequately modeled by a Rayleigh or a Rician random variable depending on the nature of the scattering environment. Without the loss of generality it will be assumed henceforth that these complex gains in the WSSUS model are mutually independent Rayleigh random variables.

A time-dependent channel impulse response h(t, τ) is defined such that the received signal can be written as a convolution of the channel impulse response and the transmitted signal. The time-dependent channel impulse response allows the wireless channel to be modeled as a band-pass filter. This can be a very helpful tool since in a discrete time model, a transmit filter and a receive match filter can be cascaded with the channel impulse response to view the entire link between a modulator and a demodulator as a single finite impulse response (FIR) filter. Based on its definition, h(t, τ) can be related to the delays and complex gains of each path as follows:

$$h(t,\tau)=\sum_{i=1}^{N}\alpha_i(t)e^{-2\pi jF_c\tau_i}\delta(\tau-\tau_i) \tag{2}$$

$$r(t)=\int_0^{\infty}h(t,\tau)s(t-\tau)d\tau$$

In equations (1) and (2) the variable $F_c$ represents the carrier frequency. The correlation between the fading waveforms is given by:

$$\phi_h(t_1,t_2;\tau_1,\tau_2;\Delta F)=E\{h_{F_c+\Delta F}(t_1,\tau_1)h_{F_c}{}^*(t_2,\tau_2)\} \tag{3}$$

This represents a general form of the correlation between the fading waveform of two narrowband channels. Using the representation of the channel impulse response from equation (2) we can write the correlation in equation (3) as:

$$\phi_h(t_1,t_2;\tau_1,\tau_2;\Delta F)=\sum_{i,k=1}^{N}E\{\alpha_i(t_1)\alpha_k^*(t_2)\}e^{-2\pi j(F_c+\Delta F)\tau_i}e^{2\pi j(F_c)\tau_k}E\{\delta(\tau_1-\tau_i)\delta(\tau_2-\tau_k)\} \tag{4}$$

With the WSSUS assumption, the average correlation in equation (4) can be simplified. Due to the uncorrelated scattering, the average $E\{\alpha_i(t)\alpha_k{}^*(t+\Delta T)\}$ can be assumed to be 0 unless i=k. This simplifies the correlation function as:

$$\phi_h(t_1,t_2;\tau_1,\tau_2;\Delta F)=\sum_{i=1}^{N}E\{\alpha_i(t_1)\alpha_i^*(t_2)\}e^{-2\pi j(F_c+\Delta F)\tau_i}e^{2\pi j(F_c)\tau_k}\delta(\tau_i-\tau_2) \tag{5}$$

In one version of the wideband channel model, the complex gains are represented by mutually independent stationary random variables with a Rayleigh distribution. This implies that the average $E\{\alpha_i(t_1)\alpha_i{}^*(t_2)\}$ depends explicitly only on $t_1$-$t_2$(Δt). With these simplifications in place, the average correlation can be written as:

$$\phi_h(\Delta t,\Delta F)=\sum_{i=1}^{N}\{E_t\{\alpha_i(t)\alpha_i^*(t+\Delta t)\}e^{-2\pi j\Delta F\tau_i}\} \tag{6}$$

If each of the paths is modeled as a Rayleigh faded channel then this can be further simplified as:

$$\phi_h(\Delta t,\Delta F)=\sum_{i=1}^{N}\{J_0^2(2\pi v_i\Delta t)\gamma_i^2e^{-2\pi j\Delta F\tau_i}\} \tag{7}$$

where the variables $\gamma_i^2$ and $v_i$ are the average received power and the Doppler shift for the $i^{th}$ path, respectively, and $J_0$ is the Bessel function of $1^{st}$ kind. These well-known properties of a Rayleigh channel have been substituted in equation (6) to obtain equation (7) which represents the time-frequency correlation of fading waveforms. In order to obtain frequency correlation of the fading waveforms, the two waveforms are considered at the same instance in time, i.e. Δt=0. Then equation (7) can be simplified as:

$$\phi_h(\Delta F) = \sum_{i=1}^{N} \gamma_i^2 e^{-2\pi j \Delta F \tau_i} = \int_0^\infty \rho(\tau) e^{-2\pi j \Delta F \tau} \quad (8)$$

Since the function $$\rho(\tau) = \sum_{i=1}^{N} \gamma_i^2 \delta(\tau - \tau_i)$$

represents the power delay profile of the wideband channel, the frequency correlation of the fades happens to be identical to the Fourier transform of the power delay profile. Thus, a channel with a larger dispersion (e.g. delay spread) would demonstrate lower correlation between the fading waveforms of two different carrier frequencies.

For an urban environment with a delay spread σ, the power delay profile can be modeled by an exponential function. Thus, the frequency correlation of the fades is given by the Fourier transform of the exponential function (Lorentzian):

$$\phi_h(\Delta F) = \frac{1}{1 + (2\pi\sigma\Delta F)^2} \quad (9)$$

Due to the finite correlation between the fades, the frequency diversity gain can be significantly lower than ideal frequency hopping for such an environment.

Figure 2:
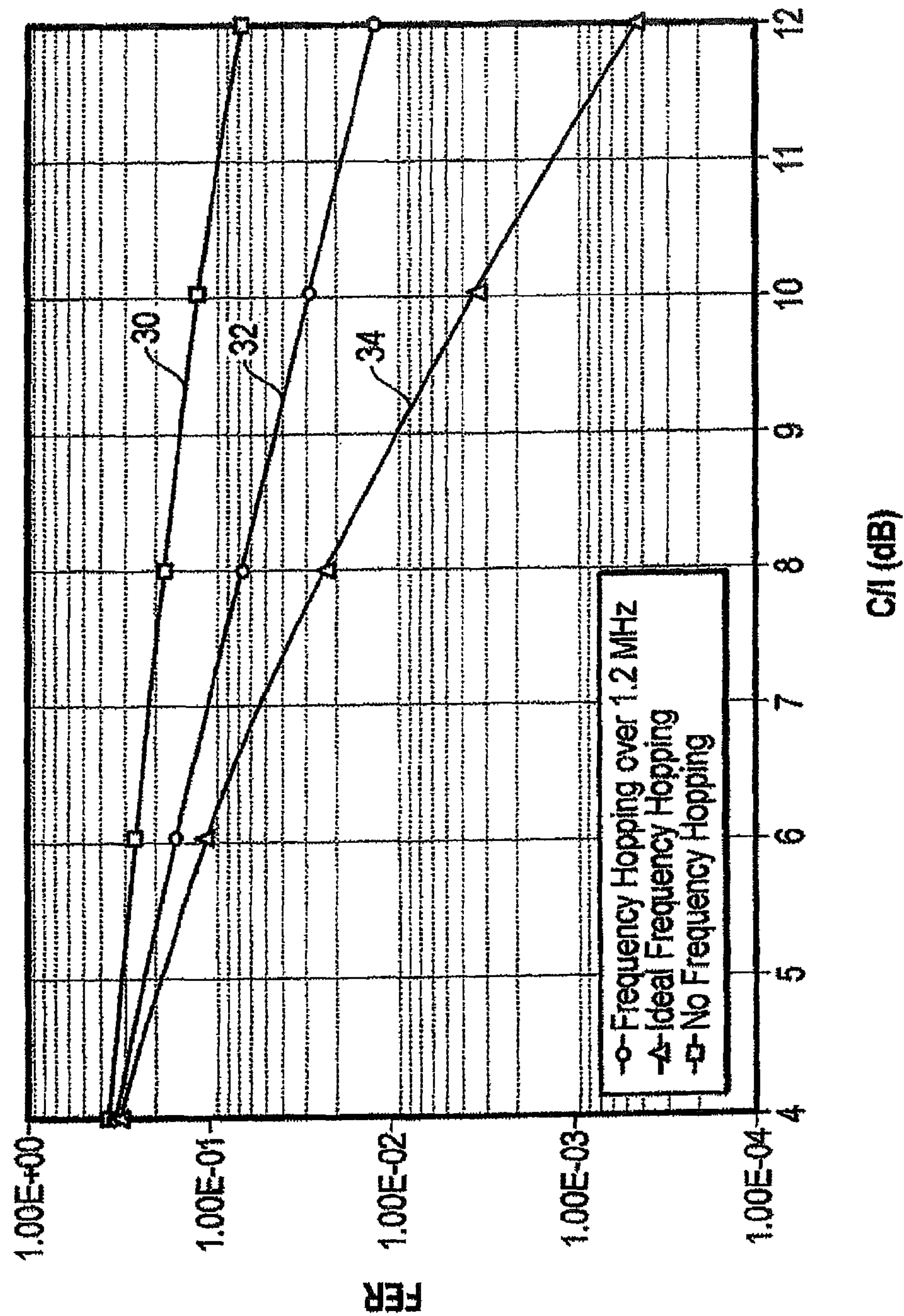
FIG. 2 is a graph illustrating an average frame error rate (FER) for a GSM enhanced full rate (EFR) vocoder in a pedestrian environment.

FIG. 2 is a graph illustrating an average frame error rate (FER) for a GSM enhanced full rate (EFR) vocoder in a pedestrian environment. FIG. 2 shows a first curve 30 indicating the FER for no frequency hopping, and a second curve 32 indicating the FER for frequency hopping above 1.2 MHz, and a third curve 34 indicating the FER for ideal frequency hopping.

The vast difference between ideal frequency hopping and no frequency hopping is evident by contrasting the third curve 34 and the first curve 30. The difference between ideal frequency hopping and frequency hopping over 1.2 MHz is also very large, thus illustrating a diminished frequency diversity gain due to correlation of fades. A coherence bandwidth of a typical urban (TU) channel is about 1 MHz, comparable to the total available spectrum in this scenario.

In the next section, embodiments of Delay Induced Scattering with Phase Randomization, a new transmission scheme that can extract near ideal frequency diversity gain in a limited spectrum, are disclosed.

2. Delay Induced Scattering with Phase Randomization

The average correlation between the fading envelopes of two narrowband channels with a given spectral and temporal separation has been modeled in the previous section. Frequency hopping from one TDMA frame to the next TDMA frame reduces the correlation of the fades from one burst to the next which improves the performance of the convolution decoder. The FER vs. C/I curves for the GSM AMR5.9 vocoder for both non-frequency hopping and frequency hopping modes are shown in FIG. 2. The frequency hopping mode has been modeled as ideal frequency hopping with no correlation between the fading waveforms from one frequency to the next. Due to this ideal nature of the frequency hopping, the gain due to frequency diversity is exceptionally large. In the case of the GSM EFR vocoder in a pedestrian environment, a 3% FER is achieved at a signal to noise ratio of 7 dB with ideal frequency hopping compared to 14 dB without frequency hopping, which represents a gain of 7 dB. However if only 1.2 MHz of spectrum were available (corresponding to 6 GSM channels) for frequency hopping, then a 3% FER is achieved at a signal to noise ratio of 10 dB, a 3 dB reduction in frequency diversity gain due to limited spectrum.

In this section, embodiments of a new transmission scheme are presented, wherein the frequency correlation is modified based on delay induced scattering with phase randomization. A purpose of modifying the frequency correlation between different channels is to achieve nearly ideal hopping performance in a limited spectrum by uncorrelating or reducing the correlation of the fades from one burst to the next. For most of the results and simulations presented herein, the total available spectrum is assumed to be 2.4 MHz which corresponds to 12 GSM channels. Also assumed is a multipath fading channel with an exponential power delay profile and a delay spread of 1 μsec, which is typical of a TU environment.

The average correlation between the fading envelopes of two carriers separated by ΔF is given by the Fourier transform of the power delay profile:

$$\phi(\Delta f) = \int_0^\infty e^{-2\pi j \Delta f \tau} \rho(\tau) d\tau \quad (10)$$

It is noted that this relationship between the frequency correlation and power delay profile is valid only for a WSSUS channel, which is an accurate model of a wireless channel under most practical situations.

Figure 3:
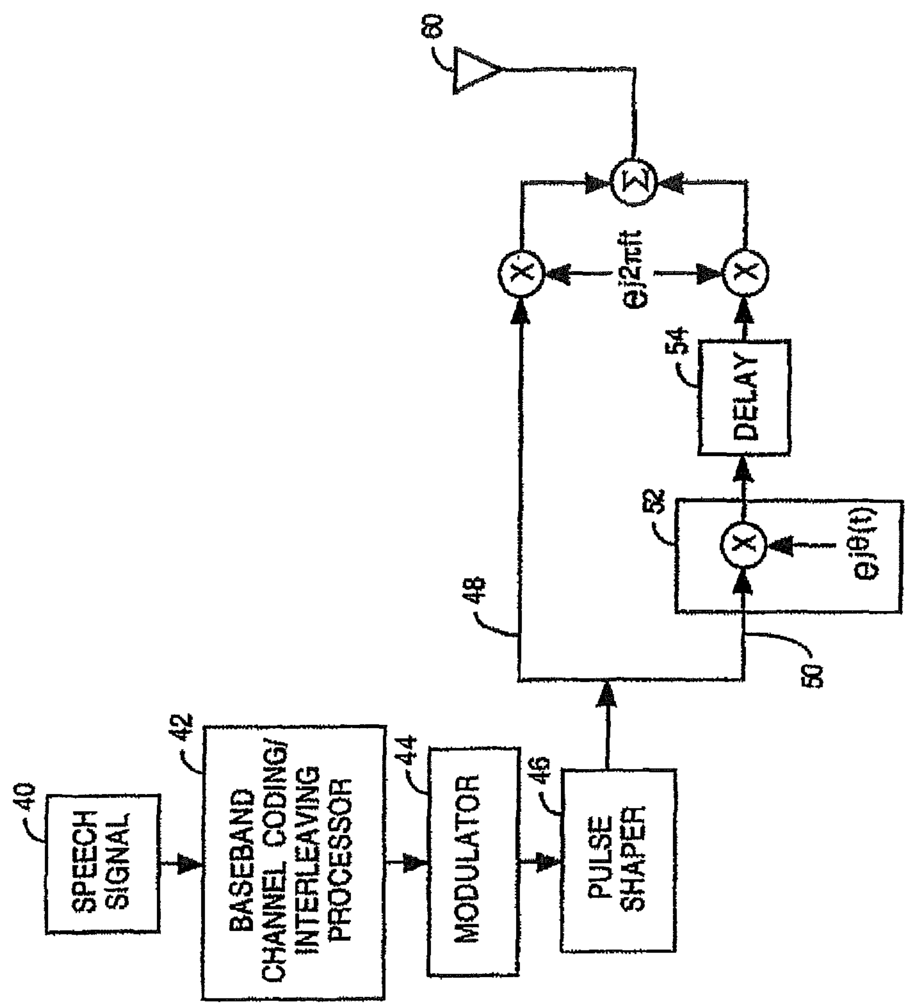
FIG. 3 is the schematic representation of an embodiment of a system to perform Delay Induced Scattering with Phase Randomization.

FIG. 3 is the schematic representation of an embodiment of a system to perform Delay Induced Scattering with Phase Randomization. A speech signal 40 or another baseband signal is processed by a processor 42. The processor 42 performs baseband channel coding and interleaving acts to the speech signal 40 to generate a processed signal The processed signal is modulated by a modulator 44 to form a modulated signal. The modulated signal is pulse shaped by a pulse shaper 46. As a result, a TDMA signal comprising a plurality of TDMA frames is formed based on the speech signal 40.

The TDMA signal is applied to two paths 48 and 50. The path 48 forms a first copy of the TDMA signal with a carrier frequency. The path 50 comprises a phase randomization component 52 to introduce a random phase, and a time delay component 54 to introduce a fixed delay. The path 50 forms a second copy of the TDMA signal with the carrier frequency, wherein the second copy has the random phase and the fixed delay relative to the first copy. The random phase changes from each TDMA frame to a next TDMA frame. The random phase is randomly generated based on a uniform distribution. The delay is fixed for all TDMA frames. The carrier frequency hops every TDMA frame.

The first copy and the second copy of the signal are combined and transmitted from the same antenna 60. The effective impulse response of the channel of this system is given by:

$$h_{eff}(t, \tau) = \frac{1}{\sqrt{2}} \sum_{i=1}^{N} \alpha_i(t) e^{-2\pi j F_c \tau_i} \delta(\tau - \tau_i) + \quad (11)$$

-continued $$\frac{1}{\sqrt{2}} e^{j\theta(t)} \sum_{i=1}^{N} \alpha_i(t) e^{-2\pi j F_c(\tau_i+d)} \delta(\tau - \tau_i - d)$$

where d is the delay and θ(t) is the random phase added to the delayed copy of the signal. The factor of $1/\sqrt{2}$ is due to about half of the total power being provided to each of the two paths 48 and 50. This is an effective way of increasing the delay spread, i.e. widening the power delay profile, which in turn makes the envelope correlation function narrower in the frequency domain, reducing the correlation between two carriers. The average correlation between the channel impulse responses of two carriers separated by ΔF in frequency is given by:

$$\phi_h(t_1, t_2; \tau_1, \tau_2; \Delta f) = \begin{aligned} &0.5 \sum_{i=1}^{N} E\{\alpha_i(t_1)\alpha^*_i(t_2)\} e^{-2\pi j(\Delta F)\tau_i} \delta(\tau_1 - \tau_2) \\ &+0.5 \sum_{i,k=1}^{N} E\{e^{j\theta(t)}\alpha_i(t_1)\alpha^*_i(t_2)\} e^{-2\pi j(\Delta F)(\tau_i+d)} e^{-2\pi j(F_c)d} \delta(\tau_1 - \tau_2 - d) \\ &+0.5 \sum_{i,k=1}^{N} E\{e^{-j\theta(t)}\alpha_i(t_1)\alpha^*_i(t_2)\} e^{-2\pi j(\Delta F)(\tau_i} e^{2\pi j(F_c)d} \delta(\tau_1 - \tau_2 + d) \\ &+0.5 \sum_{i,k=1}^{N} E\{\alpha_i(t_1)\alpha^*_i(t_2)\} e^{-2\pi j(\Delta F)(\tau_i+d)} \delta(\tau_1 - \tau_2) \end{aligned} \tag{12}$$

The second term and the third term in equation (12) are zero due to the phase randomization, which makes the copy of the signal uncorrelated to the original signal from one burst to the next. Without the phase randomization, these nonlinear cross-terms would be non-zero, and the effective envelope correlation between two carriers would depend not on ΔF but on $F_c$ and $F_c$+ΔF explicitly. In order to obtain frequency correlation of the fading waveforms, they are considered at the same instance in time, i.e. Δt=0. Then equation (12) can be simplified as:

$$\begin{aligned} \phi_h(\Delta F) &= 0.5 \sum_{i=1}^{N} E\{a_i(t)a_i^*(t)\} e^{-2\pi j \Delta F \tau_i} + \\ &\quad 0.5 \sum_{i=1}^{N} E\{a_i(t)a_i^*(t)\} e^{-2\pi j \Delta F(\tau_i+d)} \\ &= (0.5 + 0.5e^{-2\pi j \Delta F d}) \int_0^{\infty} \rho(\tau) e^{-2\pi j \Delta F \tau} \end{aligned} \tag{13}$$

The effect of the delayed and phase randomized version of the signal is to produce beating patterns. The delay d can be appropriately chosen to force the correlation of the fades between some of the carriers to zero or nearly to zero. For a delay d=0.5/W it is possible to make the correlation of the fades vanish for carriers separated by nW where n is odd and W is the separation between two consecutive carriers.

In the case of a GSM network, the carriers are separated from each other by 200 kHz (Δf=n times 200 kHz). Thus by choosing the delay between the two paths as 2.5 μsec, the frequency correlation for two GSM carriers that are separated by an odd multiple of 200 kHz is zero. However, the correlation for two GSM carriers that are separated by an even multiple of 200 kHz remains unchanged. Using more than one, e.g. two or three delayed versions each with a separate phase randomization, it is possible to force the frequency correlation to 0 for more values of ΔF.

A consequence of this approach is an increased equalization depth required at the mobile in order to remove the inter-symbol interference (ISI) since the memory of the channel is artificially increased by inserting a delayed version. In the case of a maximum likelihood sequence estimator (MLSE) equalizer, this increases the number of states in a Viterbi algorithm. For example, in going from 4 symbol equalization to 6 symbol equalization the number of states increases from 16 to 64, thus increasing the computational complexity by 8. However with a reduced state sequence estimator (RSSE) equalizer, this does not pose a problem since the number of states is independent of the channel memory.

Figure 4:
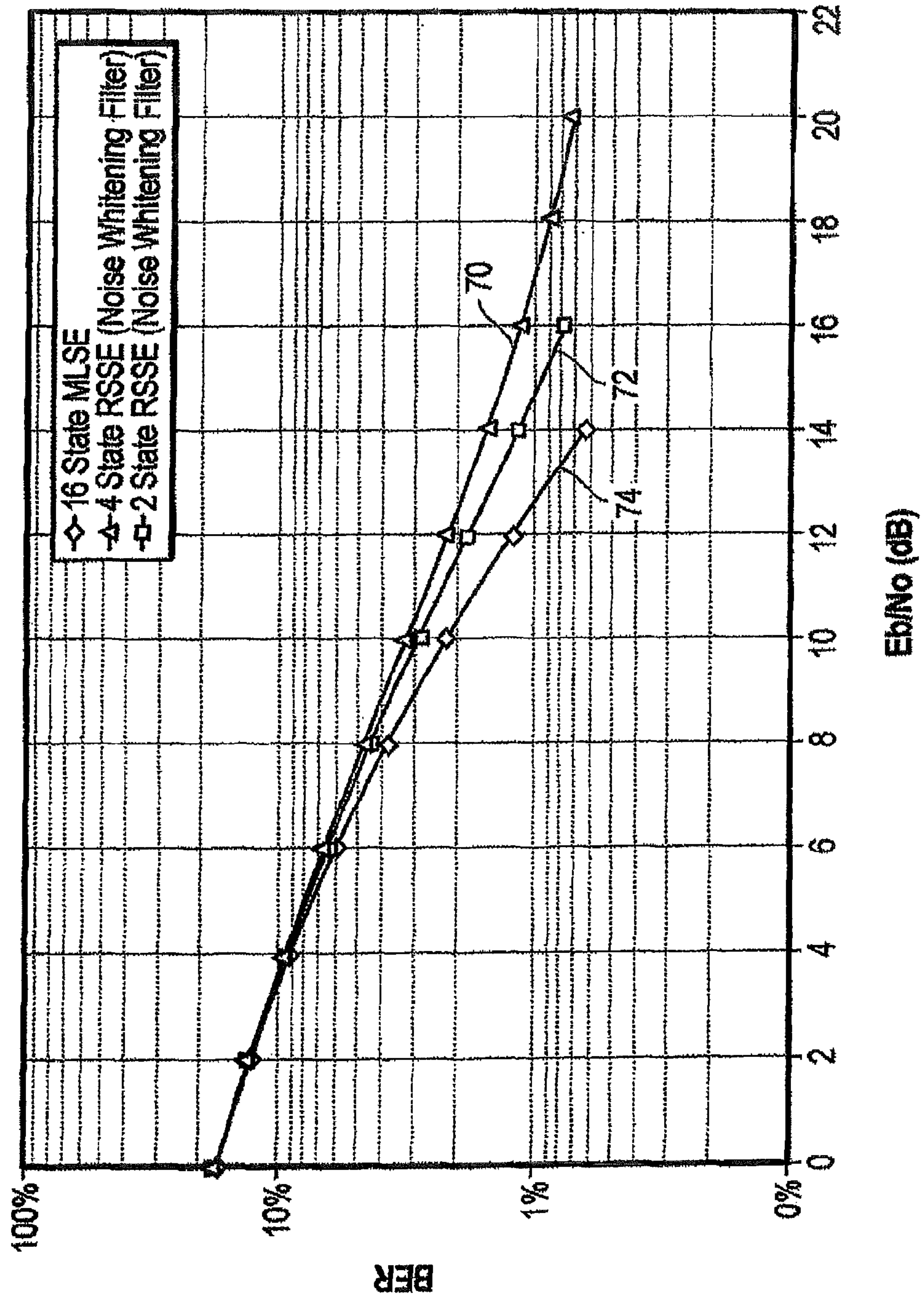
FIG. 4 shows a graph comparing the performance of an MLSE equalizer with two RSSE equalizers in a TU3 environment.

FIG. 4 shows a graph comparing the performance of an MLSE equalizer with two RSSE equalizers in a TU3 environment. The graph shows a first curve 70 indicating a performance using a 2-state RSSE, a second curve 72 indicating a performance using a 4-state RSSE, and a third curve 74 indicating a performance using a 16-state MLSE. The performances are measured as bit error rates (BER) as a function of signal-to-noise ratio (SNR). Although conceptually RSSE is sub-optimal compared to MLSE, the performance difference between the two does not appear to be that significant, especially in the 0 dB to 12 dB SNR range.

3. Simulation Results

In order to validate the concepts presented in the previous section, some preliminary simulations were performed. A GSM multipath channel simulator was used to generated faded channel impulse response over 5000 TDMA frames. The multipath channel consisted of 16 rays with exponentially decreasing power, spaced at an interval of 0.1 μsec apart from each other. Each ray was modeled as a Rayleigh path with 2.5 Hz of Doppler spread, which translates to a speed of 3 km/hr at 900 MHz carrier frequency.

The faded waveforms were averaged according to the expression in equation (7) in order obtain the frequency correlation of the fading waveforms at different frequencies. Then the channel impulse response for each of the 5000 TDMA frames was modified using the expression in equation (10) to simulate the effect of delay induced scattering with phase randomization. A time-delayed version of the channel impulse response was added with a randomized phase. The random phase was chosen to vary from one TDMA frame to the next. The resultant channel impulse response was once again processed to obtain the frequency correlation of the fading waveforms.

Figure 5:
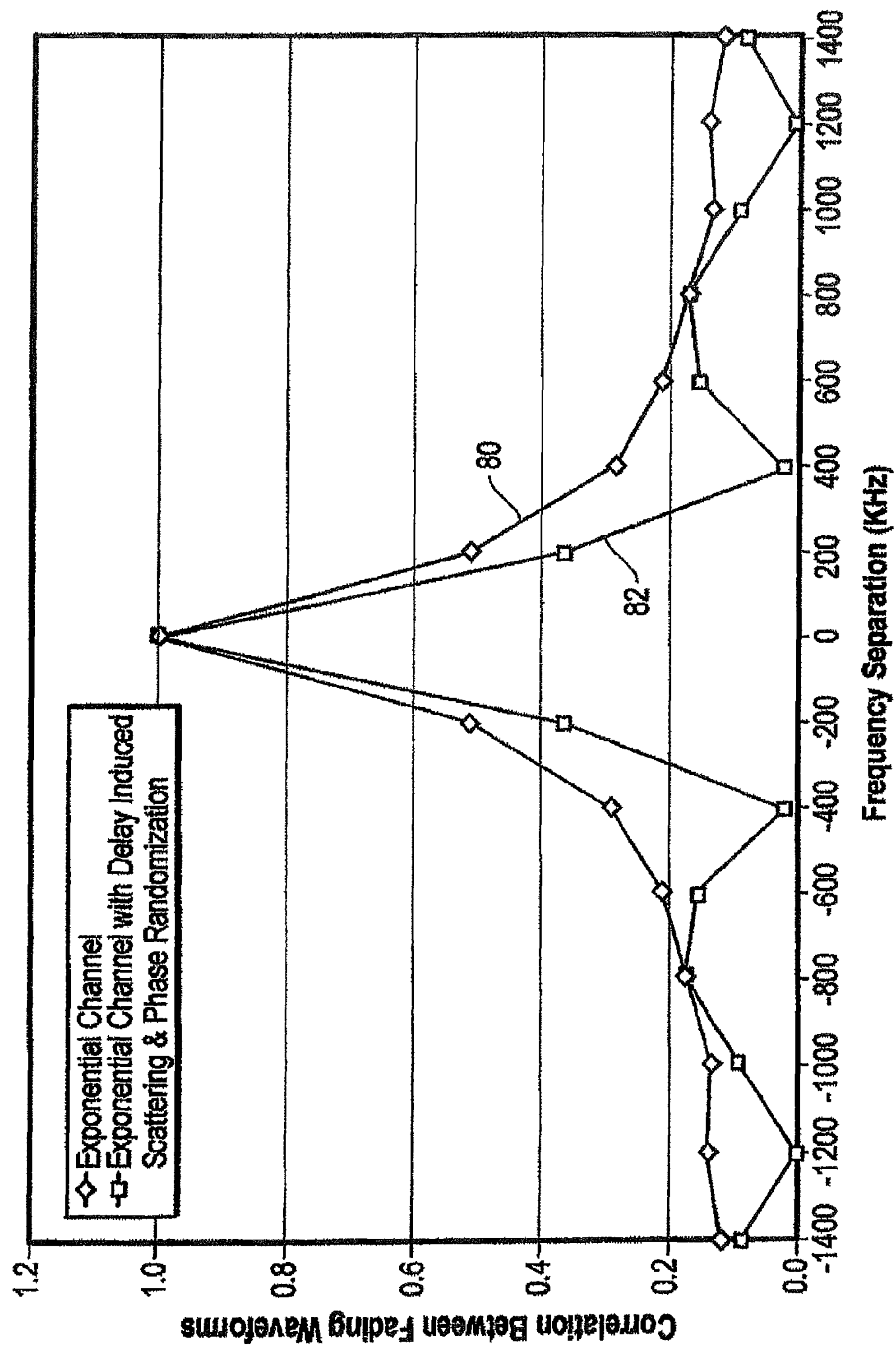
FIG. 5 shows a graph of a correlation between fading waveforms versus frequency separation for a simulation using a delay of 1.25 μsec.

FIG. 5 shows a graph of a correlation between fading waveforms versus frequency separation for a simulation using a delay of 1.25 μsec. The graph includes a first curve 80 associated with an exponential channel, and a second curve 82 associated with an exponential channel with delay induced scattering and phase randomization. As can be seen by the second curve 82, the resultant frequency correlation of the fades is zero for frequency separations of ±400 kHz, ±1200 kHz, and other odd multiples of 400 kHz, using the delay induced scattering and phase randomization. The correlation of the fades remains unchanged for frequency separations of ±800 kHz, ±1600 kHz, ±2400 kHz, and other even multiples of 400 kHz, using the delay induced scattering and phase randomization. For all other frequency separations, the delay induced scattering with phase randomization reduces the correlation but does not force it to zero.

Figure 6:
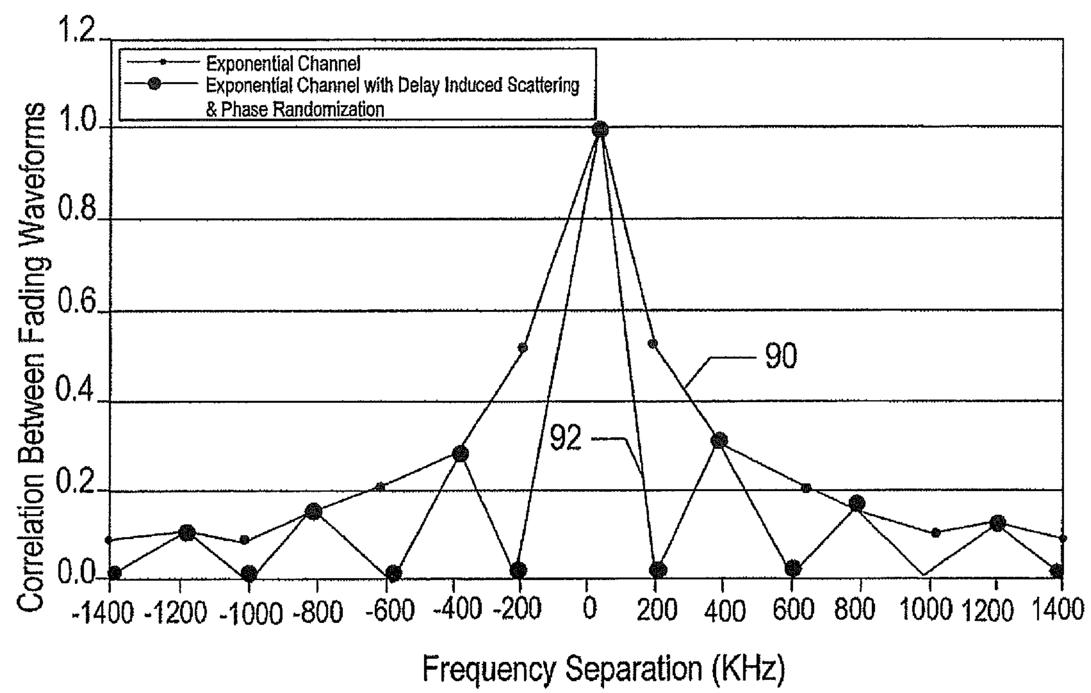
FIG. 6 shows a graph of a correlation between fading waveforms versus frequency separation for a simulation using a delay of 2.5 μsec.

FIG. 6 shows a graph of a correlation between fading waveforms versus frequency separation for a simulation using a delay of 2.5 μsec. The graph includes a first curve 90 associated with an exponential channel, and a second curve 92 associated with an exponential channel with delay induced scattering and phase randomization. As can be seen by the second curve 92, the resultant frequency correlation of the fades is zero for frequency separations of ±200 kHz, ±600 kHz, ±1000 kHz, and other odd multiples of 200 kHz, using the delay induced scattering and phase randomization. The correlation of the fades remains unchanged for frequency separations of ±400 kHz, ±800 kHz, ±1200 kHz, and other even multiples of 200 kHz, using the delay induced scattering and phase randomization. For all other frequency separations, the delay induced scattering with phase randomization reduces the correlation but does not force it to zero.

4. Partition Staggered Frequency Hopping

In the previous section, embodiments of a delay induced scattering with phase randomization transmission scheme, that are able to reduce the frequency correlation of fades in a scattering environment, was disclosed. This can improve the frequency diversity gain of TDMA wireless networks with frequency hopping. It was shown that in a GSM network with a proper choice of the delay and randomized phase, it is possible to make the frequency correlation of fades 0 for two channels that are separated by an odd multiple of 200 kHz. However, the frequency correlation remains unchanged for channels that are separated by an even multiple of 200 kHz. Without any loss of generality this transmission scheme can be extended to use more than one copy of the signal (e.g. two, three, or more copies) thus effectively making the fades uncorrelated for more channel separations. However, the correlation function cannot be forced to zero for all frequency separations.

Figure 7:
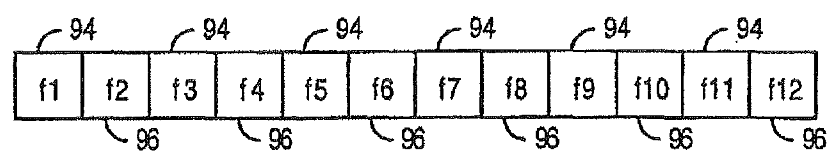
FIG. 7 is an embodiment of dividing an entire hopping spectrum into odd and even frequencies.

To extract near ideal frequency hopping performance from a limited spectrum with delay induced scattering, the entire set of hopping frequencies is partitioned into several disjoint sets such that the frequency correlation is zero between two frequencies belonging to different sets. In the case where only one delayed version of the signal is transmitted with a delay of 2.5 μsec, the entire hopping spectrum can be divided into odd frequencies 94 and even frequencies 96 as shown in FIG. 7.

The separation between two frequencies belonging to different groups is n times 200 kHz where n is odd so that their fades are uncorrelated. If the hopping frequencies are chosen so that they alternately belong to the two sets, then the fades from one TDMA frame is uncorrelated to the next TDMA frame. This can be achieved by choosing the hopping frequencies for the even numbered TDMA bursts from the set of even frequencies 96 and for the odd numbered TDMA frames from the set of odd frequencies 94. This ensures that the hopping distance is an odd multiple of 200 kHz so that fades are uncorrelated over 2 TDMA frames.

Partitioning the frequency spectrum increases the possibility of collision between two proximate sectors. For example, if two sectors are transmitting on the same frequency for a given TDMA frame, a poor performance results in both of the sectors over the duration of the TDMA frame. If a total of 12 frequencies are available for hopping, then the probability of this incidence is 1/12. However, partitioning the spectrum increases this probability to 1/6 since for a given burst both the sectors have a choice of only 6 frequencies. This increase in collision probability can be mitigated by staggering the frequency partitioning of the two sectors. The first sector transmits on even frequencies 96 for even frames and odd frequencies 94 for odd frames. The second sector transmits on odd frequencies 94 for even frames and even frequencies 96 for odd frames. By doing this on a network-wide scale the effective probability of collision is doubled (due to the reduction in number of frequencies for transmission in a given frame) but the effective number of interferers is reduced by a factor of 2. This concept is called Partition Staggered Frequency Hopping.

The concept of Partition Staggered Frequency Hopping can be extended to more than two disjoint frequency sets. For example, when two delayed copies of a signal are transmitted, one with 1.667 μsec of delay and the other with 3.333 μsec of delay, the spectrum can be divided into 3 sets such that their mutual frequency correlation is 0. A similar logic can be followed to make the fades uncorrelated over 3 TDMA frames.

Generally, for two or more frequency sets, each signal is transmitted using a respective random sequence of hopping carrier frequencies with a constraint that consecutive pairs of the hopping carrier frequencies in the random sequence are not from the same set. Further, common frames for different signals are transmitted using different hopping carrier frequencies.

It will be apparent to those skilled in the art that the disclosed inventions may be modified in numerous ways and may assume many embodiments other than the preferred forms specifically set out and described herein. It is noted that use of the word "random" should be broadly construed as being inclusive of pseudo-random.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

partitioning, at a first device, a set of hopping carrier frequencies into disjoint sets such that a frequency correlation between a first hopping carrier frequency of a first set and a second hopping carrier frequency of a second set is approximately zero, wherein the first set includes odd frequencies of the set of hopping carrier frequencies, but excludes even frequencies of the set of hopping carrier frequencies, and wherein the second set includes the even frequencies of the set of hopping carrier frequencies, but excludes the odd frequencies;

generating a copy of a signal, the signal comprising a plurality of time division multiple access frames, the copy of the signal having a fixed delay and a phase relative to the signal; and transmitting the signal and the copy of the signal using selected hopping carrier frequencies from the first set and the second set such that a time division multiple access frame is sent using the first hopping carrier frequency from the first set and an adjacent second time division multiple access frame is sent using the second hopping carrier frequency from the second set, wherein, transmitting the signal and the copy of the signal includes transmitting, using the first device, even frames of the plurality of time division multiple access frames using frequencies of the second set while a second device transmits even time division multiple access frames using the frequencies of the second set and odd time division multiple access frames using the frequencies of the first set.

2. The method of claim 1, wherein the first hopping carrier frequency and the second hopping carrier frequency include frequencies that are separated by an odd multiple of a separation value.

3. The method of claim 1, wherein the fixed delay is proportional to a separation value between the first hopping carrier frequency and the second hopping carrier frequency.

4. The method of claim 3, wherein the fixed delay is about equal to ½ W wherein W is the separation value, and wherein consecutive pairs of the hopping carrier frequencies for consecutive pairs of the time division multiple access frames are separated by an odd multiple of W.

5. The method of claim 4, wherein W is approximately equal to 200 kHz and the fixed delay is about equal to 2.5 μsec.

6. The method of claim 1, wherein the time division multiple access frames of the signal and of the copy of the signal are sent such that adjacent time division multiple access frames are sent using hopping carrier frequencies that are alternately selected from the first set and from the second set.

7. The method of claim 1, further comprising, when the first device is operating in a second operating mode, transmitting the even frames of the plurality of time division multiple access frames using the frequencies of the second set and the odd frames of the plurality of time division multiple access frames using the frequencies of the first set while the second device transmits the even time division multiple access frames using the frequencies of the first set and the odd time division multiple access frames using the frequencies of the second set.

8. A method comprising:

generating multiple copies of a signal, the signal comprising a plurality of time division multiple access frames, the multiple copies of the signal including a first copy and one or more other copies of the signal, each of the one or more other copies of the signal having a respective fixed delay and a respective phase relative to the first copy of the signal; and transmitting the multiple copies of the signal using hopping carrier frequencies, wherein the hopping carrier frequencies associated with a consecutive pair of the plurality of time division multiple access frames are separated by an odd multiple of a separation value representing a frequency separation between two adjacent carrier signals, and wherein the respective fixed delay is proportional to the separation value for each of the one or more other copies of the signal.

9. The method of claim 8, wherein the respective fixed delay comprises approximately 0.5 divided by the separation value.

10. The method of claim 8, wherein the multiple copies of the signal include a second copy of the signal having a first fixed delay and a first random phase and a third copy of the signal having a second fixed delay and a second random phase.

11. The method of claim 8, wherein the respective fixed delay associated with each of the one or more other copies of the signal is unique.

12. The method of claim 8, wherein a respective random phase associated with each of the one or more other copies of the signal is unique.

13. The method of claim 8, further comprising combining the first copy and the one or more other copies of the signal before transmitting the multiple copies of the signal.

14. A system comprising:

an antenna;

a pulse shaper to process a signal to produce a time division multiple access signal including a plurality of time division multiple access frames;

a phase randomization component to adjust a phase associated with frames of a copy of the time division multiple access signal by a random phase wherein the phase randomization component changes a first phase of a first time division multiple access frame to a second phase for a next frame of the plurality of time division multiple access frames;

a time delay component to introduce a fixed delay to the frames associated with the copy of the time division multiple access signal; and wherein the time division multiple access signal and the copy of the time division multiple access signal are combined to form a combined signal that is transmitted to a destination device using selected hopping carrier frequencies, and wherein the fixed delay is selected such that a correlation of frequency-selective fades between carrier frequencies of adjacent time division multiple access frames of the combined signal is approximately zero.

15. The system of claim 14, wherein a first hopping carrier frequency is selected for a first frame of the combined signal and a second hopping carrier frequency is selected for a second frame of the combined signal such that adjacent frames of the combined signal have corresponding hopping earner frequencies that are separated by an odd multiple of a separation value.

16. The system of claim 14, wherein the phase randomization component adjusts the phase based on a uniform distribution.

17. The system of claim 14, wherein the combined signal has a wider power delay profile than the time division multiple access signal.

18. The system of claim 17, wherein the wider power delay profile narrows an envelope correlation function in a frequency domain.

19. The system of claim 14, wherein the phase randomization component adjusts a third phase associated with second frames of a second copy of the time division multiple access signal by a second random phase, wherein the time delay component is adapted to introduce a second fixed delay to the second frames associated with the second copy of the time division multiple access signal, and wherein the combined signal includes the second copy of the time division multiple access signal including the second random phase and the second fixed delay.

20. The system of claim 14, wherein the fixed delay is proportional to a separation value between the first hopping carrier frequency and the second hopping carrier frequency.

* * * * *